United States Patent [19]
Kennedy et al.

[11] 3,755,778
[45] Aug. 28, 1973

[54] CYCLE BURGLAR ALARM

[76] Inventors: John J. Kennedy, P. O. Box 2125, Santa Clara, Calif. 95051; Leon A. Wheeler, 5111 Yorkton Way, San Jose, Calif. 95130

[22] Filed: May 4, 1972

[21] Appl. No.: 250,261

[52] U.S. Cl. ................ 340/65, 200/42, 180/114
[51] Int. Cl. ............................................. B60r 25/10
[58] Field of Search ............... 340/52 H, 63, 65; 200/42, 44; 180/114

[56] References Cited
UNITED STATES PATENTS
3,673,562   6/1972   Buell ........................... 340/63
3,678,455   7/1972   Levey ........................... 340/63

Primary Examiner—Alvin H. Waring
Attorney—Robert K. Rhea

[57] ABSTRACT

Unauthorized use or movement of a cycle is prevented by an electrical circuit including tilt and tamper switches connected with a wheel engaging retractable cable and alarm device controlled by a key operated switch.

8 Claims, 4 Drawing Figures

PATENTED AUG 28 1973    3,755,778

CYCLE BURGLAR ALARM

BACKGROUND OF THE INVENTION

1. Field of the invention

The present invention relates to alarm systems and more particularly to an alarm circuit preventing unauthorized use or movement of a cycle.

2. Description of the prior art

Unauthorized use alarm systems for vehicles, such as automobiles, is disclosed by U.S. Pat. Nos. 3,422,398 and 3,453,591 which incorporate and functions with the vehicle components to trigger an alarm in response to actions of an intruder but so far as we known the prior art does not disclose burglar alarm systems for cycles.

This invention is distinctive over these two patents by providing a housing containing a battery operated circuit containing a retractable wheel engaging cable and a tilt responsive switch with an alarm device which is controlled by a key operated switch.

SUMMARY OF THE INVENTION

A preferably metallic housing, containing a cable connected with a retracting reel, battery and audible signal means, is mounted in an out-of-the-way place on the cycle. A key operated switch, secured to one wall of the housing, forms a part of a series circuit interconnecting the battery with the signal means and retractable cable through a gate controlled silicon rectifier and including a mercury switch and a tamper switch in a manner that if the cable is cut or broken or if the cycle is moved the alarm will sound and continue until the circuit is opened by the key operated switch. A push-button switch, connected with the circuit in parallel with the key operated switch, permits operation of the signal means in traffic.

The principal object of this invention is to provide an audible alarm system preventing unauthorized use or movement of a cycle.

DESCRIPTION OF THE PREFERRED EMBODIMENT

Figures 1, 2, 3:
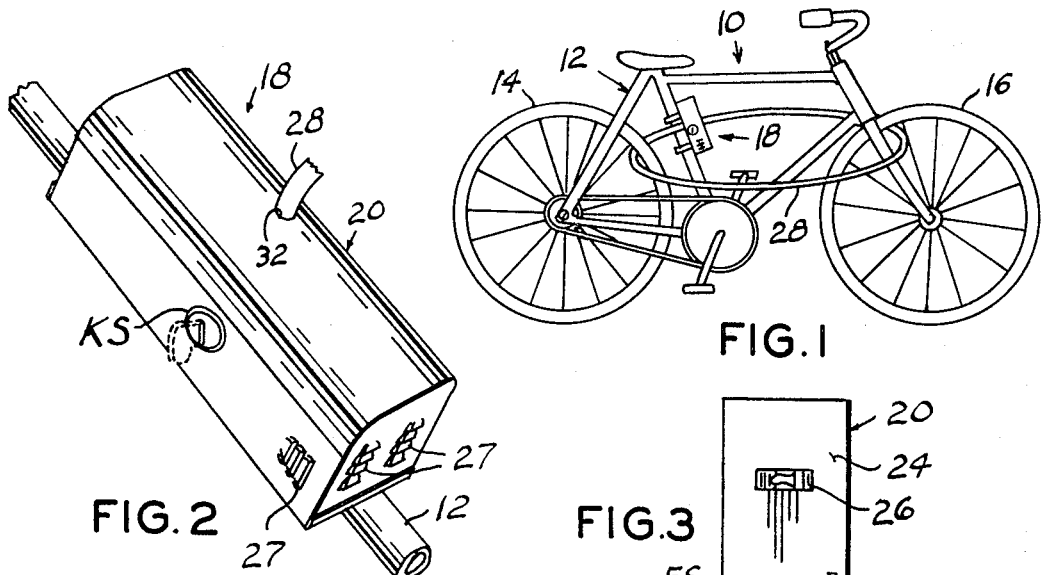
FIG. 1 is a side elevational view of a bicycle illustrating the alarm system mounted thereon in operative position.
FIG. 2 is a perspective view, to a larger scale, of the alarm system containing housing mounted on a fragment of a cycle frame and illustrating, by dotted lines, the position of a key in the key operated switch.
FIG. 3 is a back elevational view of the housing to another scale.
Figure 4:
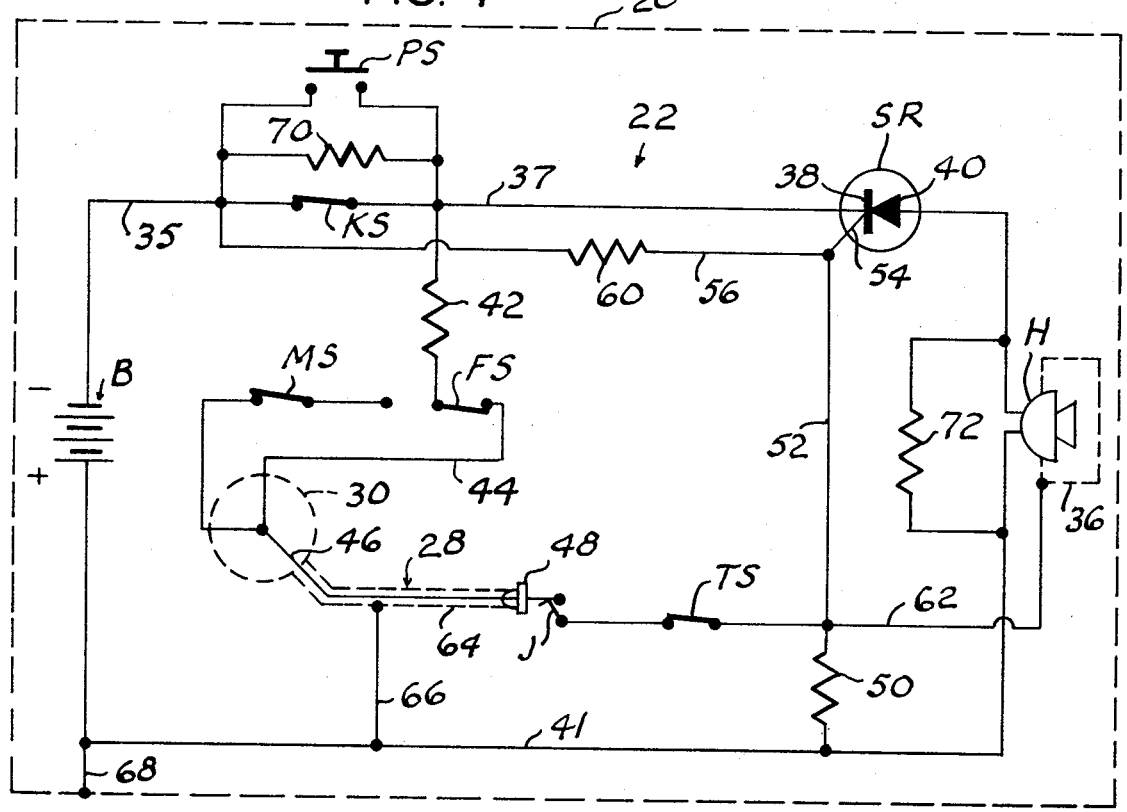
FIG. 4 is a schematic wiring diagram.

Like characters of reference designate like parts in those figures of the drawings in which they occur.

In the drawings:

The reference numeral 10 indicates a substantially conventional bicycle having a frame 12 and wheels 14 and 16.

The reference numeral 18 indicates the alarm system, as a whole, comprising a housing 20 containing an electric circuit 22. The housing 20 is provided with a back wall 24 having a pair of clamps 26 secured thereto which connect the housing to a selected portion of the frame 12. One end portion of the housing is provided with louvered openings 27 for sound wave emission.

Obviously, the housing 20 may be mounted in any selected location on the cycle, such as under the seat, where suitable. The housing contains a coaxial or shielded cable 28 secured at one end to a conventional centrifugal locking ratchet reel 30 within the housing which releases and rewinds the cable 28 by a spring, not shown, in response to manual control of the free end of the cable. The cable 28 is extended or pulled out, at its free end, from the housing through an opening 32 formed in the housing wall opposite its back surface 24. The purpose of the cable 28 is to surround and attach the cycle to a fixed object, such as a post or rack, or be inserted through the spokes of one or more of the cycle wheels when the cycle is standing free. The housing 20 also contains an audible signal device, such as a horn H, at least partially surrounded by a protective shield or grid 36. The reel, cable and horn form a part of the electrical circuit 22, as hereinafter explained.

A battery B, such as a six volt dry cell battery, contained by the housing, has its negative terminal connected with the cathode 38 of a silicon gate controlled rectifier SR in series through a key operated switch KS by wires 35 and 37. The anode 40 of the rectifier SR is connected with one terminal of the horn H. The other terminal of the horn H is connected to the positive terminal of the battery B by a wire 41 thus forming a first series circuit. A resistor 42 is connected to the wire 37 and to the center or pole connected terminal of a single pole two-position function switch FS. One terminal of the function switch FS is connected by a wire 44 to the reel connected end of the inner or center conductor 46 of the shielded cable 28. The other free end of the cable conductor 46 is provided with a plug 48 which enters a jack J, mounted on the housing back wall 24, in turn connected in series with the tamper switch TS and second resistor 50 to the positive terminal wire 41. The first and second resistors 42 and 50, with the components connected in series therewith to the battery B, form a voltage divider second series circuit for the purposes presently explained.

A third circuit comprising a wire 52, connected at one end with the gate electrode 54 of the rectifier SR, is connected at its other end to the terminal of the resistor 50 opposite the positive wire 41. The gate electrode 54 is also connected to the wire 35 in series through a third resistor 60 by a wire 56. The junction of the wire 52 and resistor 50 is connected to the horn grid 36 by a wire 62.

The shield 64 of the cable 28 is connected to the positive wire 41 by a wire 66. The positive wire 41 is grounded to the housing by a wire 68. The other terminal of the function switch FS is connected to the coaxial cable center conductor 46 through a series connected mercury switch MS. A push-button switch PS is connected with the wires 35 and 37 in parallel with the key switch KS and a fourth resistor 70 is similarly connected across the terminals of the push-button switch in parallel with the key switch KS. The push-button switch in addition to being used for sounding a warning in traffic also assures that the horn will function when the alarm system is turned "on". A fifth resistor 72 is connected with the horn terminals.

The resistor 50 has substantially more resistance than does the resistor 42. Thus, with the key switch closed and the cable plug 48 engaged with the jack J, a negative voltage is applied to the gate electrode 54 of the rectifier SR which maintains the rectifier nonconductive from its anode to cathode. As long as the key switch KS, function switch FS and tamper switch TS remain closed and the cable engaged with the jack J, negative bias voltage on the gate electrode 54 maintains the rectifier SR nonconductive and the horn inoperative. However, in the event any portion of the second series circuit between the resistor 42 and the resistor 50 is interrupted, a positive voltage is applied to the gate electrode 54 from the battery positive terminal reducing the internal resistance of the rectifier to render it conductive between its anode and cathode permitting current thorough the first series circuit thus operating the horn H. The current will continue and the horn H will continue to function in sounding an alarm until the key operated switch KS is opened to interrupt the circuit.

To prevent theft of the cycle by its being bodily picked up and carried away, for example, the function switch FS may be closed with its other terminal connected with the cable center conductor 46 through the series connected mercury switch MS which acts as an anti-tilt switch which is opened by movement of the cycle. The mercury switch MS similarly completes the second series circuit from the resistor 42 to the resistor 50 normally biasing negative voltage to the gate electrode 54 of the rectifier SR in the manner just described.

The tamper switch TS is a microswitch which is closed by mounting the housing on the cycle in such a manner that any attempt to remove the housing opens the switch TS which sounds the alarm in the manner described.

A further safety feature or anti-theft arrangement is achieved by the negative voltage biasing circuit being connected with the horn protective grid 36 so that in the event an attempt is made to disarm or render the horn H inoperative by an object inserted through one of the louver openings 27, the negative voltage biasing series circuit will be grounded to the housing 20 so that the positive current renders the rectifier SR conductive to sound an alarm. Similarly, a further protective feature resides in connecting the cable shield 64 to the battery positive terminal wire 41 so that if the cable shield 64 is contacted or an attempt made to cut it the alarm will sound.

The purpose of the resistor 60, preferably having a resistance equal to the resistance of the resistor 50, is to in effect bias the key switch KS toward the negative during the current surge resulting from closing the key switch KS.

The purpose of the resistor 70 is to reduce the current surge in the first series circuit as it is opened and closed by operating the push-button switch PS and prevents firing or rendering the rectifier SR conductive when the alarm system is turned "on" by closing the key switch KS.

The purpose of the resistor 72 is to supply a continuous current or load to the rectifier SR by acting as a spark suppressor so that the rectifier will maintain a conductive state, from anode to cathode, during such time as contact points of the horn H are open when the alarm system is sounding an alarm.

Obviously the invention is susceptible to changes or alterations without defeating its practicability, therefore, we do not wish to be confined to the preferred embodiment shown in the drawings and described herein.

We claim:

1. An alarm system for a cycle, comprising:
   a source of direct current;
   an electrically operable alarm device;
   a solid state gate controlled semiconductor triode rectifier having an anode, cathode and gating electrode;
   first circuit means connecting said current source with said alarm device and said rectifier in a first series circuit for activating said alarm device by current passing through said rectifier from the anode to the cathode,
      said rectifier having a high internal resistance so that it is normally in a nonconductive state until a voltage of predetermined magnitude and polarity is applied between said gating electrode and said cathode to reduce the electrical resistance to a low value,
      said low value of electrical resistance permitting current to pass continuously through the rectifier between the anode and cathode until the current in said first series circuit is interrupted;
   at least one normally closed switch means arranged to be opened by a person unauthorized to contact said cycle;
   first and second electrical resistance means;
   a voltage divider circuit connecting said current source with said normally closed switch means in series between said first and second electrical resistance means forming a second series circuit; and,
   a third circuit connecting said gating electrode with said second series circuit between said switch means and said second electrical resistance means for applying a voltage of predetermined magitude and polarity to said gating electrode and normally maintaining said rectifier nonconductive between its anode and cathode,
   whereby when said normally closed switch means is opened said third circuit applies a voltage of predetermined magnitude and opposite polarity to said gating electrode to render said rectifier conductive between its anode and cathode.

2. The alarm system according to claim 1 and further including:
   a key operated switch connected in series in said first series circuit.

3. The alarm system according to claim 2 in which said normally closed switch means includes:
   a jack; and,
   a coaxial cable having an electrical conductive shield surrounding a center conductor,
      said center conductor having a plug formed on one of its ends and removably received by said jack.

4. The alarm system according to claim 3 in which said normally closed switch means further includes:
   a microswitch.

5. The alarm system according to claim 4 in which said normally closed switch means further includes:
   a mercury switch.

6. The alarm system according to claim 5 in which said electrical conductive shield is connected with said first series circuit.

7. The alarm system according to claim 6 and further including:
   a housing adapted to be connected with said cycle and surrounding said alarm system.

8. The alarm system according to claim 7 and further including:
   a normally open push-button switch connected with said first series circuit in parallel with said key operated switch for operating said alarm device independently of said second series circuit.

* * * * *